United States Patent [19]

Suzuki

[11] 4,095,260

[45] June 13, 1978

[54] COLOR PICTURE TUBE DEVICE

[75] Inventor: Hirofumi Suzuki, Mobara, Japan

[73] Assignee: Hitachi, Ltd., Tokyo, Japan

[21] Appl. No.: 787,749

[22] Filed: Apr. 15, 1977

[30] Foreign Application Priority Data

Apr. 19, 1976 Japan .................................. 51-43541
Apr. 19, 1976 Japan ............................ 51-48099[U]

[51] Int. Cl.[2] ............................................ H04N 5/657
[52] U.S. Cl. .................................... 358/248; 335/210
[58] Field of Search ................ 358/248, 249; 335/210, 335/212

[56] References Cited

U.S. PATENT DOCUMENTS 4,006,301 2/1977 Bubacz ................................ 358/248
4,016,363 4/1977 Deal et al. ............................ 358/248

*Primary Examiner*—Robert L. Richardson
*Assistant Examiner*—Edward L. Coles
*Attorney, Agent, or Firm*—Charles E. Pfund

[57] ABSTRACT

In a color picture tube device of the electromagnetic deflection in-line electron gun type including a color picture tube with a neck portion and funnel portion and a deflection yoke device mounted near the joint between the neck portion and the funnel portion and provided with a deflection yoke assembly having an inner diameter sufficiently larger than the joint neck and funnel portion such that the deflection yoke can move in a direction perpendicular to the tube axis, the deflection yoke device comprises supporting means for supporting the deflection yoke assembly having a first portion movable along the neck portion and a second portion disposed substantially perpendicular to the first portion but tiltable with respect to the tube axis, means for securing the deflection yoke assembly to the second portion of the supporting means, and at least two wedge means inserted and fixed in a gap between the funnel portion and the deflection yoke assembly.

6 Claims, 5 Drawing Figures

COLOR PICTURE TUBE DEVICE

BACKGROUND OF THE INVENTION

This invention relates to an electromagnetic deflection in-line electron gun type colour picture tube device having a deflection yoke device mounted on a joint neck and funnel portion of a colour picture tube.

Conventionally, a self-convergence type colour picture tube device has been known which includes a colour picture tube with three electron guns arranged in line in the horizontal deflection direction and a deflection yoke device mounted to the colour picture tube for generating an astigmatism correcting magnetic field consisting of the horizontal deflection magnetic field in the form of a pincushion and the vertical deflection magnetic field in the form of a barrel. In this type, when the astigmatism correcting magnetic field of this deflection yoke device is selected such that the convergence of three electron beams are optimum over the entire phosphor screen, the landing adjustment of the electron beams is accomplished by only adjusting static convergence on the central portion of the picture screen resulting in that a dynamic convergence adjusting circuit is not necessary at all, which has been necessary in a prior art colour picture tube of three electron guns arranged in a delta configuration.

In one example of a prior art colour picture tube device of this type, as will be explained referring to the accompanying drawings hereinafter, a deflection yoke having a considerably larger inner diameter than the outer diameter of the funnel and neck portion of colour picture tube is employed and this deflection yoke is fixedly mounted to the colour picture tube in such a manner that a yoke ring which is integral with the deflection yoke is bonded by using hotmelt type bonding material such as for example polyamide resin to the supporting columns of the funnel ring bonded to the funnel portion after adjustment of the location of the deflection yoke against the colour picture tube has been completed.

With this construction, however, there has been a disadvantage of requiring a long manufacturing time due to the fact that it takes about 5 to 7 minutes for the hotmelt type bonding material to harden, which bonding material has been applied to the yoke ring integral with the deflection yoke after adjusting the location of the deflection yoke. Furthermore, there has been a difficulty for reliable fixation since the deflection yoke is bonded to only the funnel portion with a relatively large gap maintained between the deflection yoke and the neck portion so that the deflection yoke is fixed to the funnel portion in a cantilever fashion, thereby resulting in peeling off or dislocation.

SUMMARY OF THE INVENTION

Accordingly, an object of this invention is to provide an improved colour picture tube device in which the deflection yoke is fixedly mounted to the colour picture tube with high efficiency.

Another object of this invention is to provide an improved colour picture tube device in which the deflection yoke is fixedly mounted to the colour picture tube with high reliability.

According to this invention, these objects can be accomplished by providing a colour picture tube device of the electromagnetic deflection in-line electron gun type including a colour picture tube with a neck portion and funnel portion and a deflection yoke device mounted near the joint between the neck portion and the funnel portion and provided with a deflection yoke assembly having an inner diameter sufficiently larger than the joint neck and funnel portion such that the deflection yoke can move in a direction perpendicular to the tube axis, characterized in that the deflection yoke device comprises supporting means for supporting the deflection yoke assembly having a first portion movable along the neck portion and a second portion disposed substantially perpendicular to the first portion but tiltable with respect to the tube axis, means for securing the deflection yoke assembly to the second portion of the supporting means, and at least two wedge means inserted and fixed in a gap between the funnel portion and the deflection yoke assembly.

DESCRIPTION OF THE PREFERRED EMBODIMENTS

Figure 1:
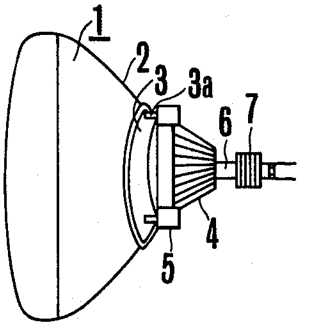
FIG. 1 (PRIOR ART)
FIG. 1 is a side view showing one example of a prior art colour picture tube device with a deflection yoke assembly.

Prior to describing preferred embodiments of this invention, referring to FIG. 1, one example of a prior art electromagnetic deflection in-line electron gun type colour picture tube device with a deflection yoke will be firstly explained.

As illustrated in FIG. 1, a funnel ring 3 is fixed to a predetermined position on a funnel portion 2 of a colour picture tube 1 by using hotmelt bonding material, and then a yoke ring 5 integral with a deflection yoke 4 is secured to the funnel ring 3. At a neck portion 6, a magnet assembly 7 is provided for adjusting the static convergence on the central portion of phosphor screen and the colour purity. The magnet assembly 7 comprises, as well known in the art, a pair of two-pole rotatable magnet rings for purity adjustment, a pair of four-pole rotatable magnet rings and a pair of six-pole rotatable magnet rings, the latter two pairs being adapted for adjustment of the static convergence. The way for mounting the deflection yoke 4 will be explained hereinafter. The colour picture tube 1 mounted with the funnel ring 3 and the yoke ring 5 integral with the deflection yoke 4 are incorporated into a mechanical adjuster not shown with which the location of the deflection yoke is three-dimensionally adjusted in relation to the colour picture tube. At the first, by means of the magnet assembly 7, the static convergence and the purity at the central portion of the picture screen are adjusted. Then, the purity over the entire picture screen is adjusted by moving the yoke ring 5 integral with the deflection yoke 4 in a direction of the tube axis of the colour picture tube 1. Further, dynamic convergence is adjusted by moving the deflection yoke 4 in a direction perpendicular to the tube axis and at the same time, inclination and angular displacement of deflection yoke 4 are adjusted. Finally, the yoke ring 5 are bonded to four supporting columns 3*a* of the funnel ring 3 by hotmelt type bonding material.

However, in this conventional mounting expedient the colour picture tube device cannot be removed from the mechanical adjuster before the bonding material is cooled to solidify so that the yoke ring 5 is completely bonded to the supporting columns 3*a* of the funnel ring 3.

The above-mentioned conventional expedient has a defect that in addition to a time of 4 to 5 minutes required for adjusting the location of the deflection yoke, it takes 5 to 7 minutes before the hotmelt bonding material applied to the yoke ring solidifies and the colour picture tube device is then removed from the mechanical adjuster. Further, for the purpose of adjusting the dynamic convergence, it is necessary to move the deflection yoke 4 in a direction perpendicular to the tube axis at neck portion 6 of the colour picture tube 1 and as a result, it is necessary to make the inner diameter of the deflection yoke 4 to be larger than the neck portion 6. However, as described above, the deflection yoke 4 is not secured directly to the neck portion 6 but instead bonded to the funnel portion 2 through funnel ring 3 and yoke ring 5 so that deflection yoke 4 is supported in a cantilever fashion, thus decreasing the reliability of fixing.

Figure 2:
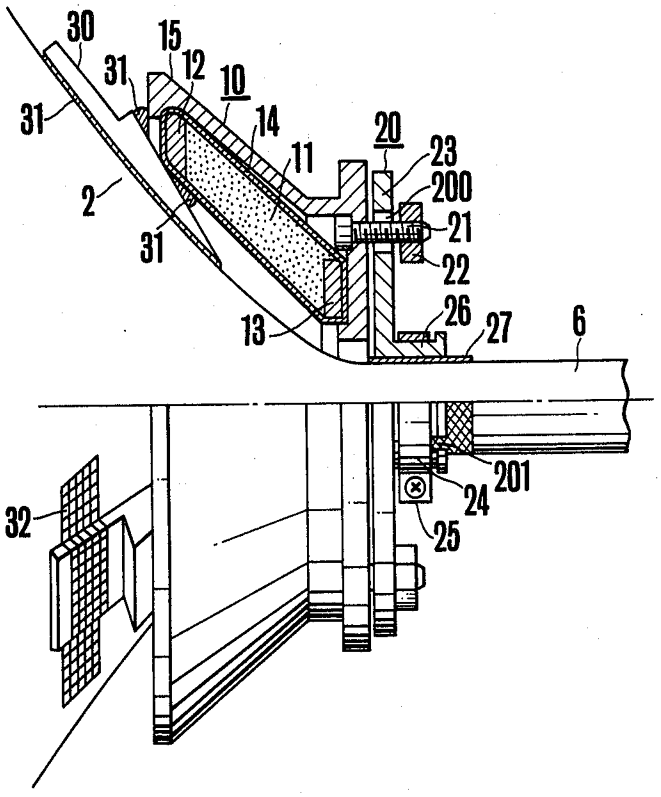
FIG. 2 is a side view, partly in section, showing one embodiment according to this invention.

With referrence to FIG. 2, one embodiment according to this invention will now be described. A deflection yoke assembly generally indicated by reference numeral 10 comprises a core 11 made of ferrite both ends of which are mounted with a front grooved ring 12 and a rear grooved ring 13 made of synthetic resin. Around the core 11 is wound a coil 14 passing through the grooves of the front and rear grooved rings. This structure is contained in a deflection yoke supporting member 15 made of synthetic resin. The front grooved ring 12, the rear grooved ring 13 and the deflection yoke supporting member 15 are put together mechanically or by means of bonding agent. The inner diameter of coil 14 is so selected that a gap is formed between not only the funnel portion 2 but also the neck portion 6 and the coil 14.

A supporting member, generally designated at numeral 20, for supporting the deflection yoke assembly 10 comprises a flange portion 23 and a boss portion 26 and its entirety is made of non-magnetic, flexible material such as for example synthetic resin. The boss portion 26 takes the form of a cylinder the longitudinal axis of which extends in a direction substantially perpendicular to the flange portion. Accordingly, the flange portion 23 extends in a direction substantially perpendicular to the boss portion 26. The cylinder has an inner diameter slightly larger than the outer diameter of the neck portion so that the boss portion 26 can move along the neck portion 6 of colour picture tube 1, and is fixed to the neck portion 6 through a tape 27 wound thereabout by means of a band 24 and a screw 25. For the purpose of positively securing the cylinder to neck portion 6, a plurality of notches 201 are usually formed in a longitudinal direction of the cylinder. Thus, when the band 24 is clamped around the boss 26 by the screw 25, the boss portion 26 is deformed to a given extent owing to the presence of the notches 201 and shrinks to be positively secured to the neck portion. In this embodiment, the abovementioned supporting member 15 for supporting the deflection yoke is fixed to the flange portion 23 by tightening a nut 22 applied to a bolt 21 passing through a hole 200 of the flange portion.

The supporting member 20 is required to be flexible. "Flexibility" herein means that the flange portion 23 extending in approximately parallel with respect to a plane perpendicular to the longitudinal axis of the cylindrical boss 26 can tilt a predetermined angle in any direction under the application of an external force. This "flexibility" can be obtained by making the supporting member 20 from an elastic material such as synthetic resin, vinyl chloride resin and the like, for example.

Figure 3:
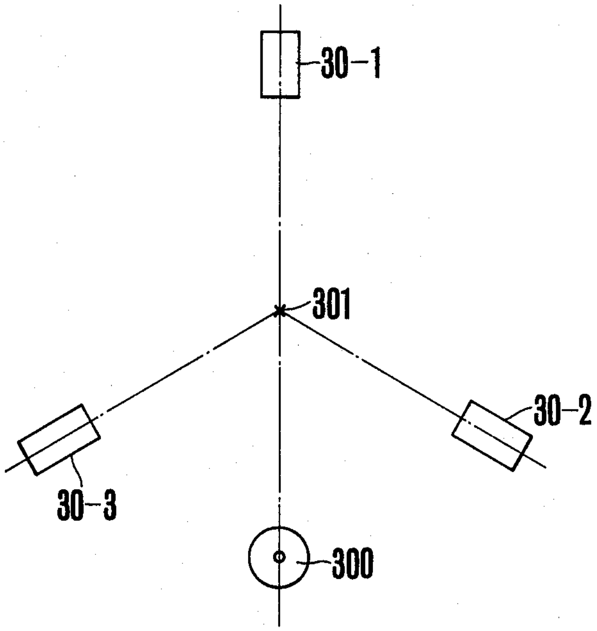
FIG. 3 is diagram illustrating an optimum position where wedges according to this invention are to be mounted.

As the hole 200 is oblong in a direction perpendicular to the tube axis, the deflection yoke assembly 10 can be adjusted in its position in a direction normal to the tube axis, without removing the bolt 21 from the hole 200. Furthermore, as the supporting member 20 is flexible in the sense as mentioned above, the flange portion 23 is tiltable with respect to the tube axis. In other words, the flange portion 23 can tilt through a suitable angle or several degrees around a position perpendicular to the boss portion 26 so that the deflection yoke assembly can be adjusted to take a desired three dimentional position. At least two, preferably three wedges 30 are inserted in the gap between the funnel portion 2 of the colour picture tube and the deflection yoke assembly 10. Wedge 30 is preferably made of a silicon resin. It is bonded and fixed to the funnel portion 2 and to the deflection yoke assembly 10 by using a bonding agent of, for example, silicon system.

Where three wedges 30 are to be mounted on the funnel portion 2, as shown in FIG. 3, it is advantageous to arrange wedge 30-1 at a position opposite to a high voltage terminal 300 of the colour picture tube, with reference to tube axis 301, more particularly at a position opposite to the high voltage terminal 300 with respect to the tube axis 301 and on a line on the funnel portion which is defined by the intersection of a plane containing the tube axis 301 and the high voltage terminal 300 with the funnel portion 2. Wedges 30-2 and 30-3 are arranged at a position 120° spaced from the wedge 30-1. In this manner, inserting of wedges can easily be carried out without interferring with high voltage wire and the deflection yoke assembly can also be installed on the colour picture tube in a well balance relationship. A tape 32 is used to fix wedges 30. The tape 32 may be removed after the bonding agent 31 is hardened.

In adjusting the location of the deflection yoke assembly 10 of this construction in relation to the colour picture tube 1, a magnet assembly, not shown but similar to that shown in FIG. 1, is adjusted at first for obtaining the static convergence and the colour purity at the central portion of the picture screen. Then, an adjustment for the purity over the entire picture screen is carried out by moving the deflection yoke assembly 10 in a direction of the tube axis, and an adjustment for the dynamic convergence is carried out by moving it in a direction normal to the tube axis and tilting it with respect thereto. Of course, these adjustments may be repeated for a highly fine adjustment. During this procedure, an optimum relative position between the colour picture tube 1 and the deflection yoke assembly 10 can be obtained. Thereafter, the deflection yoke supporting member 15 is fixed by bolt 21 and nut 22 to the deflection yoke assembly supporting member 20 which, in turn, is fixed by band 24 and screw 25 to the neck portion 6 wound with tape 27. Thereafter, preferably three wedges 30 are placed at an equal angular spacing and bonded in a gap between the funnel portion 2 of the colour picture tube 1 and the deflection yoke assembly 10 by using bonding agent 31. The tape 32 is applied on the wedges 30 until the bonding agent solidifies.

If a slip preventive member is provided by forming fine irregularities at the interface between the deflection yoke assembly 10 and supporting member 20 or a thin rubber film is inserted into this interface, effectiveness of the fixing of the deflection yoke assembly can be promoted.

Figure 4:
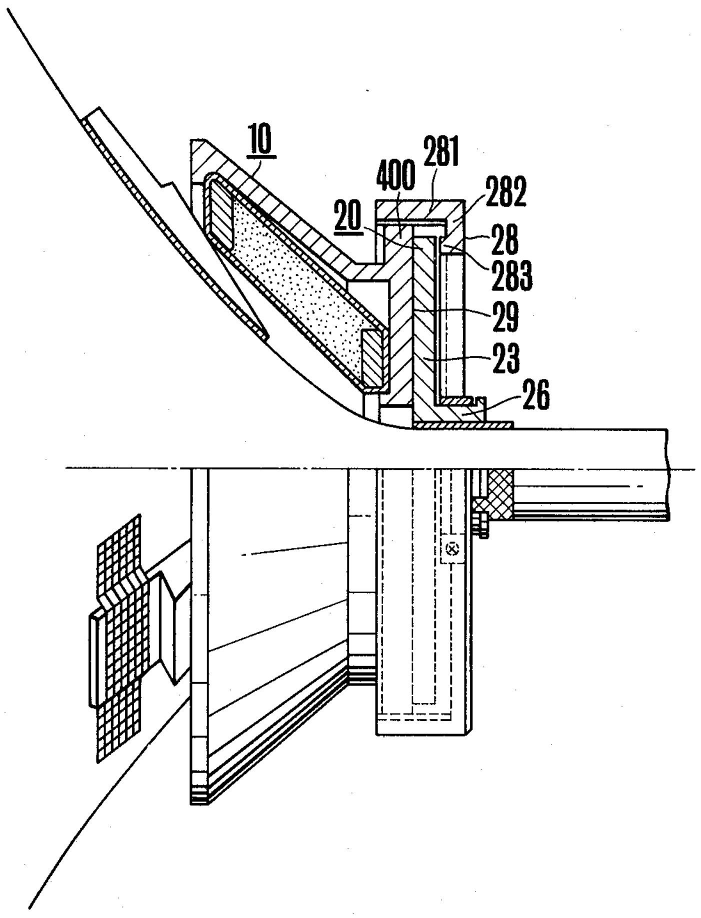
FIG. 4 is a side view, partly in section, of another embodiment of this invention.

FIG. 4 shows another embodiment of fixing means between the deflection yoke assembly 10 and the supporting member 20. The supporting member 20 essentially comprises the flange portion 23 and the boss portion 26, similar to the embodiment shown in FIG. 1. At the other periphery of a flange 400 constituting the rear end of a deflection yoke assembly 10 is provided a threaded portion. The deflection yoke assembly 10 and the supporting member 20 can be put together fixedly by engaging a lock ring 28 with the thread portion of the flange 400. The lock ring 28 comprises a cylinder 281, an annular flange 282 and a projection 283 projecting inward from the inner edge of the annular flange 282.

The inner edge of the cylinder 281 is threaded for engagement with the with the threaded portion of the flange 400. Under this engagement, the rear surface of the flange 400 and the projection 283 of the lock ring 28 sandwich a part of the flange portion 23 of the supporting member 20, thereby the deflection yoke assembly 10 being fixedly mounted to the supporting member 20. Except the construction just mentioned, this embodiment is similar to the previous embodiment of FIG. 2.

Figure 5:
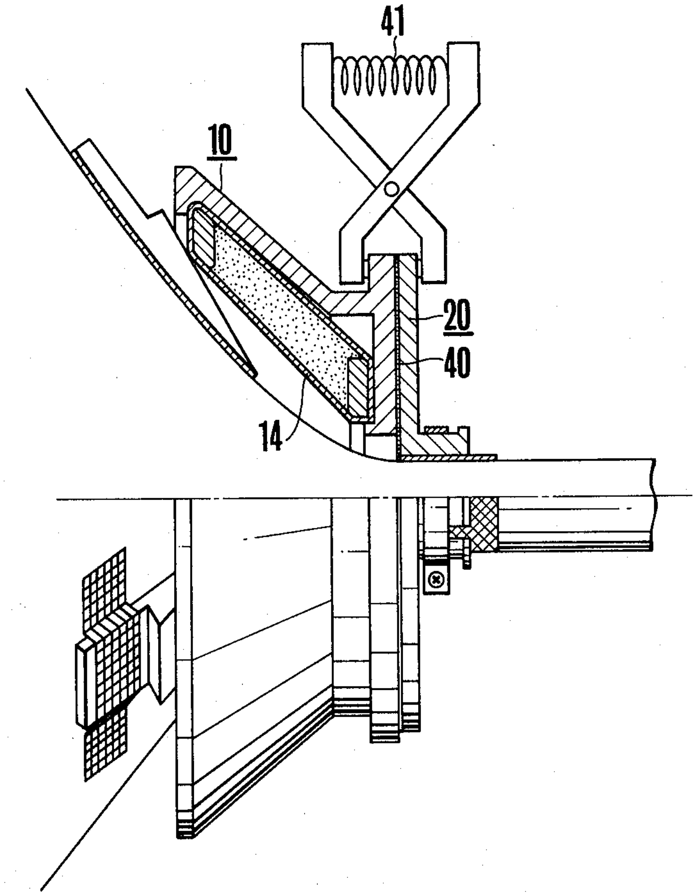
FIG. 5 is a side view, partly in section, of still another embodiment of this invention.

In FIG. 5, a third embodiment of this invention is shown. In this embodiment, a deflection yoke assembly 10 and the supporting member 20 for supporting the deflection yoke assembly are put together by bonding agent 40. Until the bonding agent is completely solidified both members are held in engagement by means of a plurality of auxiliary fixing members 41 for temporal use.

Although the foregoing embodiments have been described by way of the deflection yoke of a toroidal type both for horizontal and vertical deflections, this invention may obviously be applicable to the deflection yoke or other types such as of semitoroidal type which is of a toroid for one of the two deflections and of a saddle for the other or saddle type for both the two deflections.

As has been described in the foregoing description, according to this invention, it is possible to obtain a colour picture tube device which can be manufactured with high efficiency and in which the colour picture tube and the deflection yoke assembly can be put together with high reliability.

What is claimed is:

1. In an electromagnetic deflection in-line electron gun type colour picture tube device including a colour picture tube with a neck portion and funnel portion and a deflection yoke device mounted near the joint between said neck portion and said funnel portion and provided with a deflection yoke assembly having an inner diameter sufficiently larger than the joint neck portion and funnel portion such that said deflection yoke assembly can move in a direction perpendicular to the tube axis, the improvement wherein said deflection yoke device comprises supporting means for supporting said deflection yoke assembly having a first portion movable along said neck portion and a second portion disposed substantially perpendicular to said first portion but tiltable with respect to the tube axis, means for securing said deflection yoke assembly to said second portion of said supporting means, and at least two wedge means inserted and fixed in a gap between said funnel portion and said deflection yoke assembly.

2. The colour picture tube device according to claim 1, wherein said wedge means comprises three wedges arranged to be located on the funnel portion in an equal 120° space relationship.

3. The colour picture tube device according to claim 2, wherein one of the three wedges is fixed at a position opposite to a high voltage terminal of the colour picture tube with respect to the tube axis and the other two wedges of them are each secured at position 120° spaced from said one wedge.

4. The colour picture tube device according to claim 1, wherein said securing means comprises a bolt and a nut mating the bolt, said bolt being mounted to said deflection yoke assembly and passing through a hole formed in said second portion.

5. The colour picture tube device according to claim 1, wherein said deflection yoke assembly comprises a rear flange the outer periphery of which is provided with a threaded portion and a lock ring is mated with the threaded portion to secure said deflection yoke assembly to said supporting means.

6. The colour picture tube device according to claim 1, wherein said deflection yoke assembly comprises a deflection yoke supporting member having a flange and a bonding agent is applied between said flange and said second portion to secure said deflection yoke assembly to said supporting means.

* * * * *